Nov. 5, 1968            M. MAYRATH            3,409,119
CLAMP-ON SLIDING INLET COVER CONTROL ASSEMBLY
FOR AUGER CONVEYORS
Filed Oct. 17, 1966
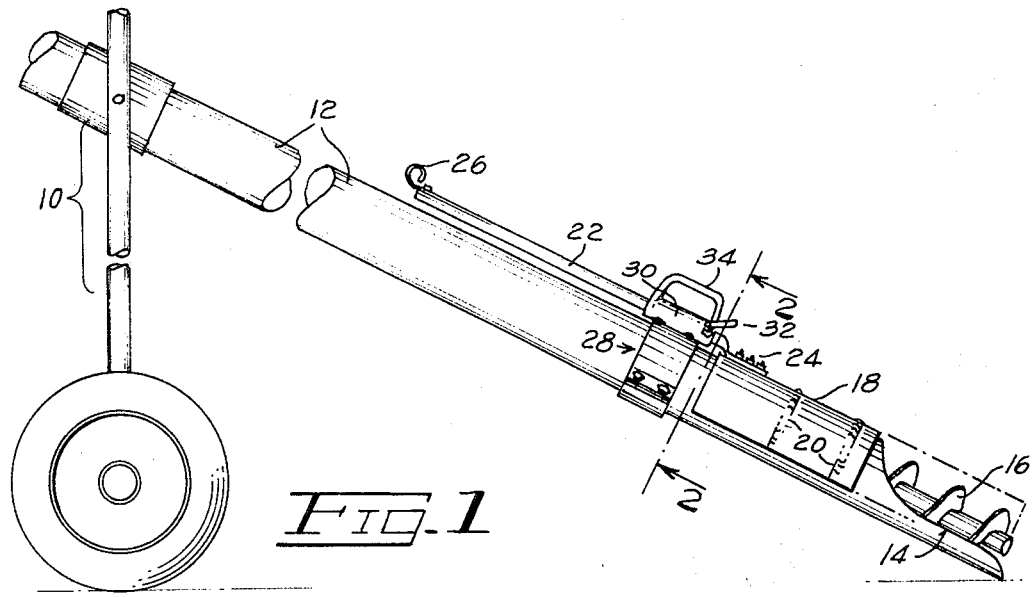
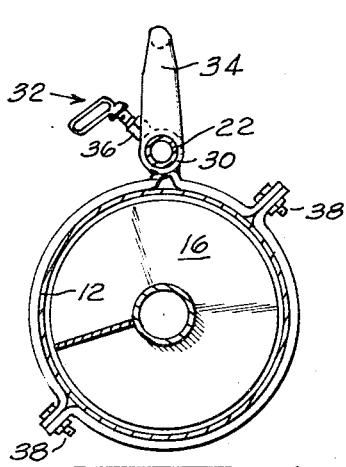
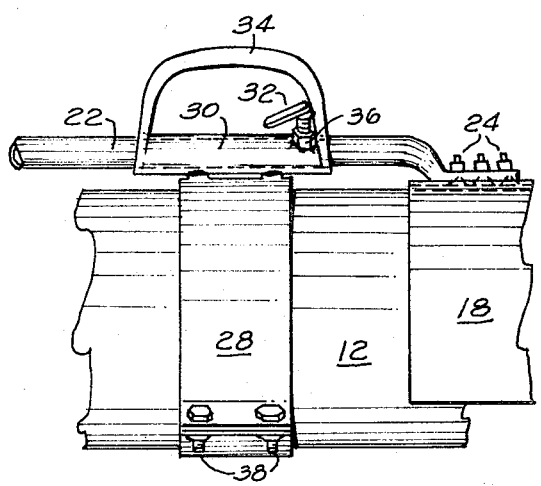
INVENTOR:
Martin Mayrath
BY Homer R. Montague
ATTORNEY { # United States Patent Office 3,409,119
Patented Nov. 5, 1968

3,409,119
CLAMP-ON SLIDING INLET COVER CONTROL ASSEMBLY FOR AUGER CONVEYORS
Martin Mayrath, 10707 Lennox Lane,
Dallas, Tex. 75229
Filed Oct. 17, 1966, Ser. No. 587,097
2 Claims. (Cl. 198—213)

ABSTRACT OF THE DISCLOSURE

An auger conveyor has the top portion of the lower end thereof open for the supply of granular and similar material to be conveyed through the tube by the auger; a sliding cover is movable downwardly, when desired, to partially close the open top of the conveyor tube to control the rate of supply of material to the conveyor tube, the sliding cover being carried by a bar at one end thereof slidable in a tubular member fixed to the conveyor tube by a surrounding clamp, and a handle is carried by the tubular member to assist in maneuvering the lower end of the conveyor, and a screw clamp adjacent the handle engages the rod extending through the tubular member to hold it fixed in any adjusted covering position.

---

This invention is directed to improvements in auger conveyors, and especially to an improved adjustable inlet cover by which the rate of input of material can be adjusted, from practically zero to the full capacity of the conveyor. Such regulation is desirable to accommodate the machine to materials of different "toughness" (from the handling standpoint)), as well as to allow for use of a smaller drive motor on occasion, without exceeding its power rating.

The invention also provides an integral handle for convenient raising or steering of the inlet end of an auger of the wheeled or portable type, and for easy installation on any proper-size auger tube, by means of simple tools.

In brief, the invention accomplishes these and other aims by means of a sliding sheet metal inlet cover of partially-cylindrical U-shaped section, secured to one end of a position-adjusting rod arranged to parallel the long axis of the auger tube or housing. This rod passes through, and is selectively clamped in, a short heavy gauge tubular pipe section welded to a split-band clamp tightly encircling the auger tube. A substantial handle spans the length of the pipe section, being secured integrally thereto as by welding, and a clamp screw threaded in the same pipe section allows the rod, and hence the inlet cover, to be clamped in the desired longitudinal position. The construction is rugged yet economical, and is extremely efficient in use, affording a complete range of control of the degree of auger inlet restriction.

In the drawings,

FIG. 1 is a side view showing the application of the novel inlet cover to an auger conveyor of known form, parts of the latter being indicated schematically.

FIG. 2 is an enlarged transverse section taken substantially on line 2—2 of FIG. 1 and looking in the direction of the arrows.

FIG. 3 is an enlarged detail view (actually, a view from the right side of FIG. 2) showing the construction of the main features of the combination.

FIG. 1 of the drawings shows the application of the invention to one form of auger conveyor, its wheeled supporting framework 10 being shown merely diagrammatically and by way of example. The main sheet-metal auger tube is indicated by numeral 12, and at its inlet end the tube is cut away on top as at 14, to expose the inlet end of the auger screw 16 of known form. The usual motor or engine for driving the auger has not been illustrated, as this power source, and the drive train, may be of any known or convenient type.

To regulate the degree of exposure (or restriction) of the auger 16 at the inlet end, a sliding cover 18 is provided, the same being of U-shaped section to conform to the shape of tube 12, and preferably stiffened by peripheral ribs 20. This cover is shown in full lines in its retracted (non-covering) position, and it can slide to the right to the extent indicated by chain lines, where it practically closes the inlet for the grain or the like to be handled.

To secure the cover 18 in any desired position of adjustment, its upper edge is connected to a control rod (or tube) 22, as by internally flush-head bolts 24 passing through the cover and a flattened end of the control rod. The rod extends parallel to the auger tube, and at its upper end may have a convenient adjustment grip such as at 26.

A split clamp 28 surrounds the auger tube 12 at a suitable distance from its lower end, and one section of the clamp has welded to it a stubby tube 30, through which slides the control rod 22. A clamp screw 32 is threaded in this guide tube, allowing the rod (and hence the inlet cover) to be held in the desired lengthwise position. Spanning the guide tube 30 is a handle loop 34, which is preferably welded to the tube ends, and hence is securely fastened to clamp 28. This handle enables the operator to lift or swing the auger tube in a convenient way, and, with tube 30, provides a rugged anchor for the firm support of control rod 22.

FIGS. 2 and 3 show the main parts in greater detail for clarity. For example, the clamp screw 32 is shown as threaded through tube section 30 to which a thick nut element 36 has been welded for greater strength of this connection. The split clamp sections embracing the auger housing tube 12 are indicated as connected by bolts 38, providing for easy application to any auger tube of suitable diameter. Other parts are designated by the same numbers as in FIG. 1, and their necessary or essential relationships will thereby be made clear to those skilled in this general field.

With a minimum number of simple and rugged parts, the invention provides an adjustable inlet cover of nearly universal application in the auger conveyor art, and in addition a convenient handle for manipulation of the auger housing. Low cost, with great efficiency and utility, are results of the sharing of functions between the few properly designed components of the whole.

While the invention has been described herein in some detail, it will be appreciated that various changes can be made without departing from the spirit of the invention as defined in the appended claims.

What is claimed is:

1. A sliding cover for the inlet end of an auger conveyor of the type having an auger housing tube and a rotary auger screw therein, said cover comprising a sheet of metal curved to conform to and arranged over the upper profile of said housing, a control rod extending from one end of said cover and paralleling said housing thereabove, a tubular guide for said control rod, rod-clamping means on said tubular guide, split-sleeve clamp means for securing said tubular guide fixedly to said housing, and a handle integral with said tubular guide and extending longitudinally therealong.

2. An arrangement according to claim 1, in which said rod-clamping means includes a clamping screw threaded through the wall of said guide and angularly offset from said handle.

(References on following page)

References Cited

UNITED STATES PATENTS

| | | | |
|---|---|---|---|
| 2,290,039 | 7/1942 | Ford | 198—213 X |
| 2,769,525 | 11/1956 | Herscovitch | 198—213 X |
| 2,988,203 | 6/1961 | Peterson | 198—213 |
| 3,080,960 | 3/1963 | Rensch | 198—64 |
| 3,141,541 | 7/1964 | Mayrath | 198—233 X |
| 3,253,695 | 5/1966 | Gooding | 198—64 |

FOREIGN PATENTS

| | | |
|---|---|---|
| 1,123,714 | 6/1956 | France. |
| 1,342,905 | 10/1963 | France. |
| 850,850 | 10/1960 | Great Britain. |

EVON C. BLUNK, *Primary Examiner.*

M. L. AJEMAN, *Assistant Examiner.*